INVENTOR.
MELVIN A. CARTER
BY
J. B. Felshin
ATTORNEY

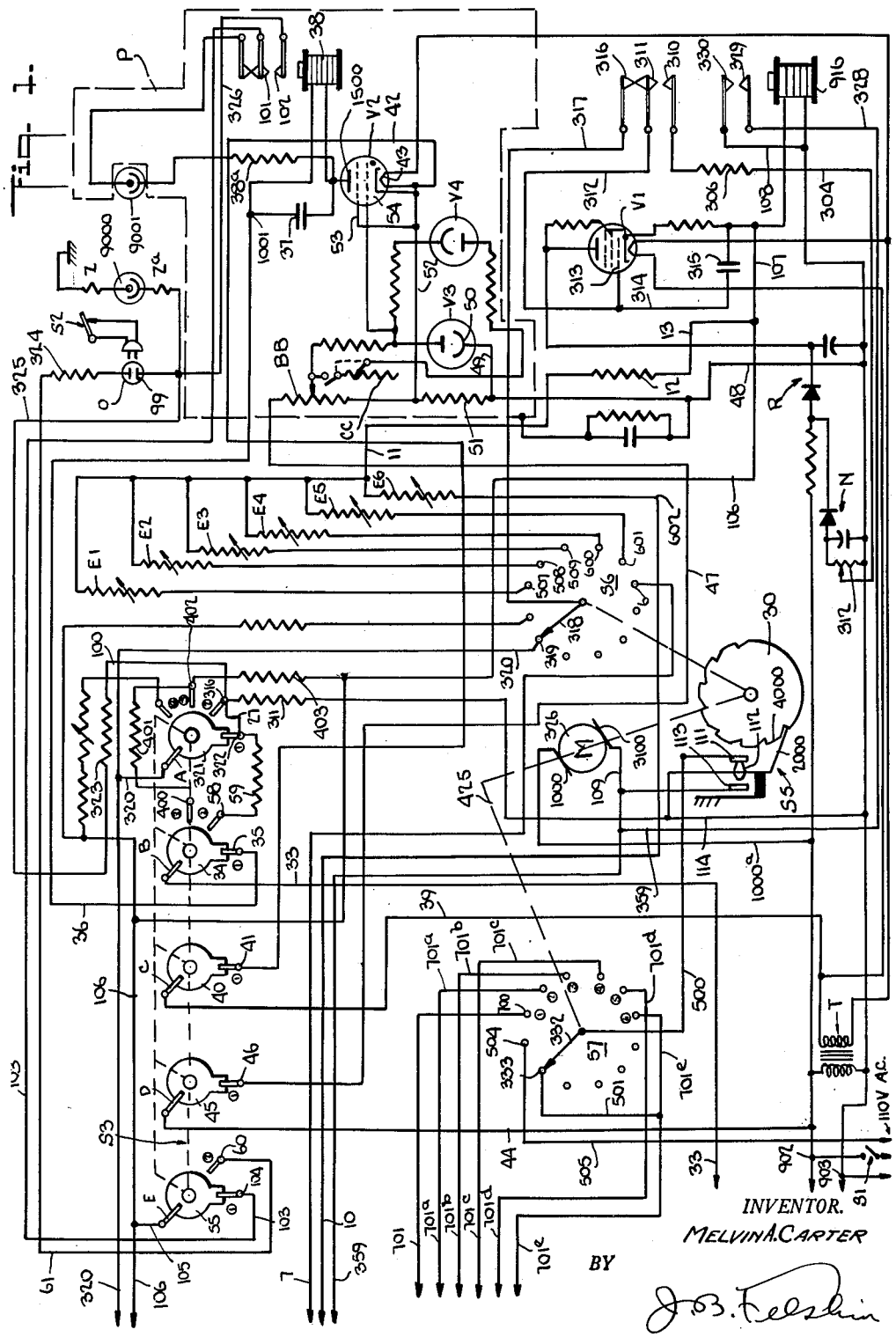

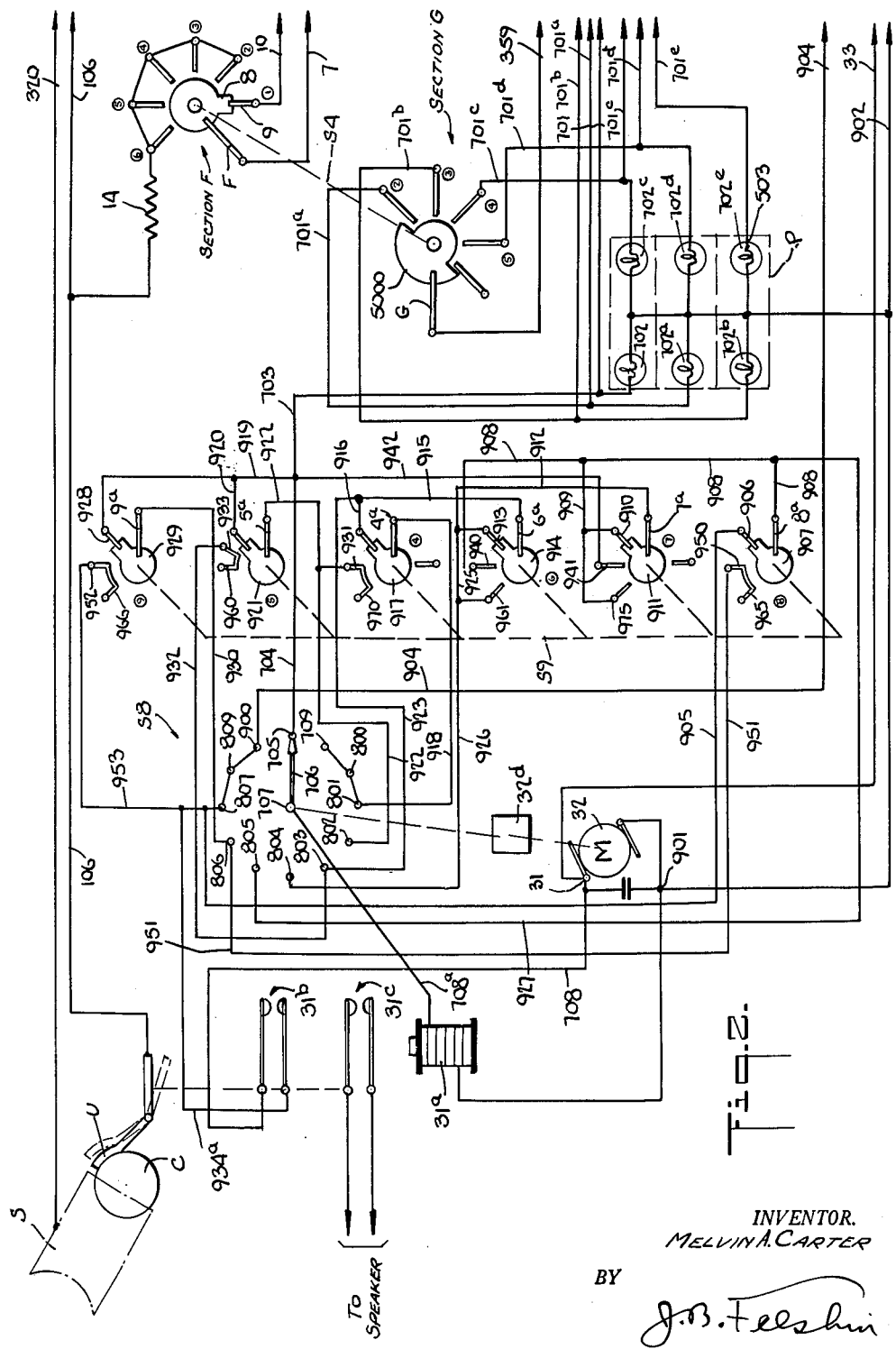

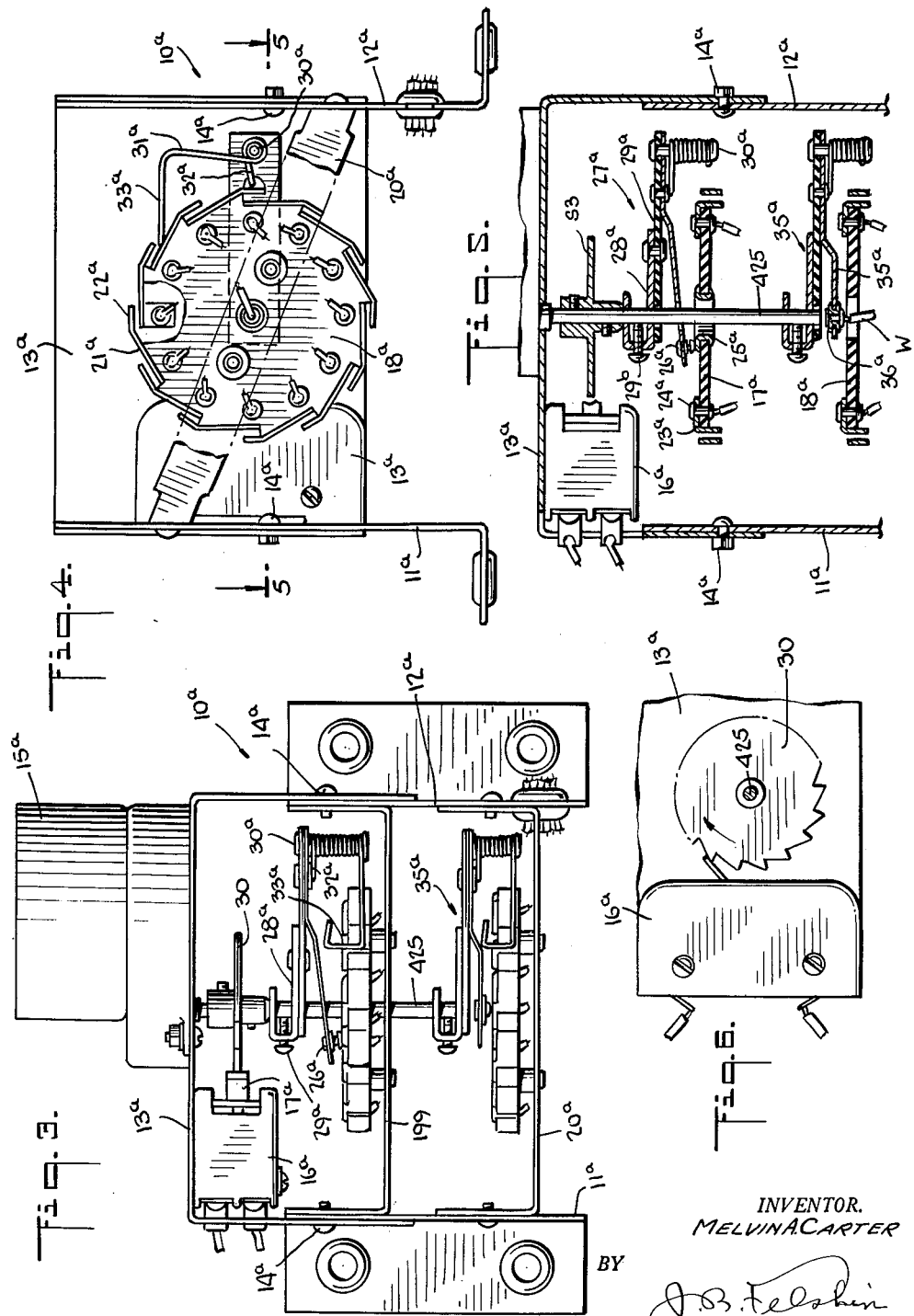

United States Patent Office 3,088,996
Patented May 7, 1963

3,088,996
SYSTEM FOR AUTOMATICALLY DISPLAYING ILLUMINATED PICTURES AND DELIVERING SOUND MESSAGES COORDINATED THEREWITH
Melvin A. Carter, New York, N.Y.
(913 St. Marks Ave., Brooklyn, N.Y.)
Filed May 25, 1956, Ser. No. 587,292
3 Claims. (Cl. 179—1)

My invention relates generally to talking display systems and is directed particularly to a system for automatically displaying a series of individual pictures while at the same time delivering corresponding coordinated sound messages with each picture for advertising or educational purposes.

The principal object of my invention is to provide a sound and picture display apparatus comprising a plurality of lamps for individually illuminating a like plurality of pictures or transparencies, each for a given period of time, a sound tape having individual sound or narration parts for each picture, and electronically controlled timing mechanism for synchronizing the sound with the picture and operative so that the lighting of each successive picture and its corresponding sound narration will always begin together.

Another object of my invention is to provide a sound display apparatus of the character described above, including a normally lit picture panel for attracting attention and means controlled by external conditions, such as by a person near the device stepping on a treadle switch, or interrupting a photo-cell optical system, or inserting a coin, to activate the electronic timer and thereby start the sequential display of pictures and narration.

Another object of my invention is to provide a sound display apparatus of the above nature, having selective means for effecting either only one cycle of display operation after first being actuated, or delayed recycling.

Another object of my invention is to provide a sound display apparatus of the character described above, wherein the electronic timer circuit comprises a charging condenser connected with the grid of an electronic tube and normally charged at a negative potential, and a condenser discharge circuit controlled by the cycle actuating switch or other device effective to cause the tube to conduct through relay to initiate operation of a stepping switch which, in turn, provides subsequent condenser discharge circuit paths corresponding to subsequent picture display and narration intervals.

Still another object of my invention is to provide an automatic serially-operated sound and picture apparatus of the character described, that is readily adjustable with respect to the length of time assigned to each picture, which is readily adapted for changing of the number of picture panels to be operative in a complete cycle of operation, and which is economical, compact, long-wearing and dependable in operation.

Still another object of my invention is to provide an improved stepping switch for use in combination with the electronic timer circuit.

The foregoing and other objects and advantages of my invention will be apparent from the following description when taken in conjunction with the appended drawings.

In the drawings, wherein like reference numerals denote corresponding parts throughout the several views:

FIGS. 1 and 2 taken together are an electrical schematic diagram of the sequential picture sound display apparatus according to the invention;

FIG. 3 is a top view of the two-gang stepping switch mechanism for the sequential switching of the picture display illumination;

FIG. 4 is an end view of the switch shown in FIG. 3;

FIG. 5 is a horizontal cross-sectional view of the stepping switch taken along the line 5—5 of FIG. 4;

FIG. 6 is an elevational view showing the indexing disc associated with the stepping switch in elevation;

Figure 7:
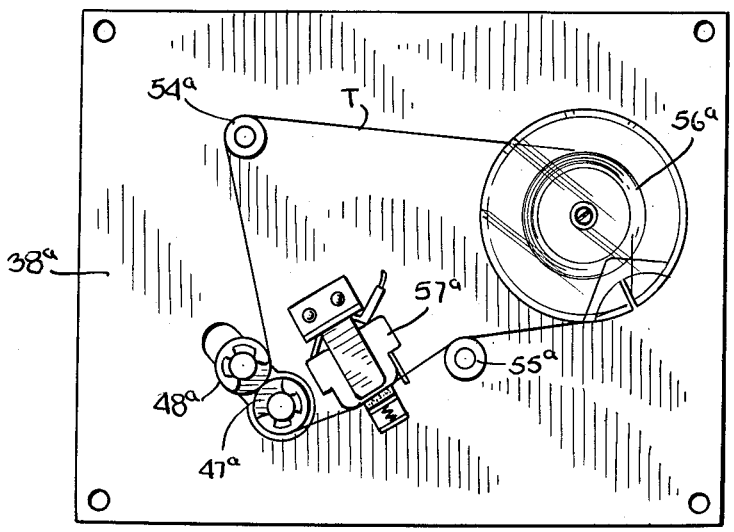
FIG. 7 is a top view of the tape recorder unit associated with the display apparatus.
Figure 8:
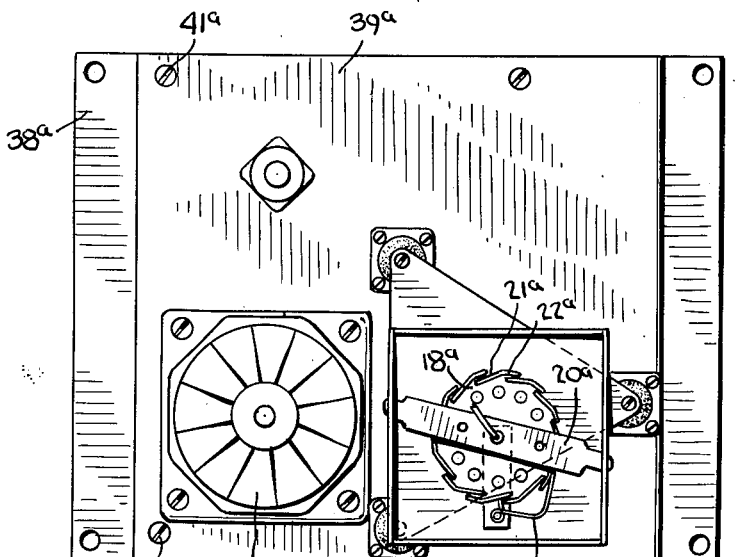
FIG. 8 is a bottom view of the recorder unit.
Figure 9:
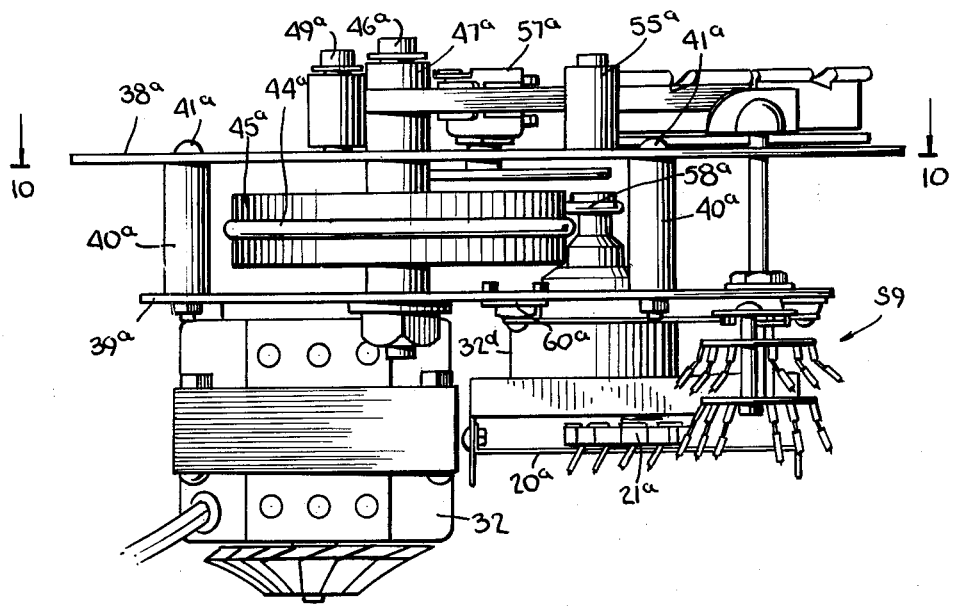
FIG. 9 is a side view of the recorder unit.

In brief, my invention comprises a display panel P (FIG. 2) having a plurality, six in the present example, of individual pictures or transparencies to be sequentially illuminated by six lamps P1 through P6. A tape record mechanism (FIGS. 7–11), having pre-recorded sound or narration portions for each picture to be displayed is combined with the display panel so that the lighting and corresponding sound portion are always in synchronization under control of the circuit means hereinbelow described. The sequential cycle of operation can selectively be set into operation either by a person intercepting available light falling upon a pair of phototubes in a phototube control circuit, or by a treadle switch operated by a person standing in the vicinity of the display apparatus. The device can also be set to operate continuously, a new cycle beginning substantially immediately after the previous cycle has been completed, or continuously with a variable time delay between successive periods of cyclical display operation. The display apparatus is readily adjusted for changing the individual periods of display for each picture and can also readily be adjusted to include more or less display pictures in the cycle of operation, as may be required.

The electronic means for controlling the sequence of lighting of the picture or scenes and the sound associated with each illuminated transparency will now be described in detail with reference to FIGS. 1 and 2.

When power line switch S' is closed, the energization circuit of the transforrer T is completed to supply 6.3 volt filament current for a control tube V1. At the same time, plate voltage is supplied to the tube V1 from a half wave rectifier circuit indicated at R energized by the line voltage. After a brief warm-up period, the tube V1 will conduit, thereby energizing the coil of a sensitive relay 916 in the cathode circuit of said tube.

A large negative charge voltage from an adjustable tapped resistor 312 comprising the bleeder resistor of a half-wave rectifier N is conducted through wire 304, resistor 306, through now closed contacts 310, 311 associated with relay 916, wire 312, wire 314 to condenser 315 to charge it at a high negative potential. When the condenser change becomes sufficient to change the potential at the grid 313 with which it is connected, the conductivity of tube V1 is interrupted, until such time as the charge of condenser 315 leaks off by way of the grid 313, wire 312, not closed contacts 311, 316 associated with the relay 916, wire 317, movable contact 318 of selector switch S6, contact 319, wire 320, pole *a* of cycling initiation selector switch S3, through movable contact 321 and contact 322 of switch S3, to wire 100, resistor 323, wire 325, to terminal 99 of outlet 0, wire 326, normally open contacts 101, 102 of relay 38, wire 103, contact 104, of switch S3, movable contact 55 of said switch through pole E to wire 106, wire 107, to top of relay coil 916. At this point leak off of condenser 315 is accomplished through coil 916. After leak off, tube V1, resumes conductivity. Contacts 329 and 330 associated with relay 916 are therefore closed operated. Momentary voltage is then applied to two gang selector switch motor from the 110 volt source 326, through wire 108, contacts 330 and 329, wire 328, wire 359, wire 109, to terminal 3100 of said motor. Due to the fact that the high side of the 117 volt A.C. line is continuously joined to terminal 1000 of motor 326 through wire 1000a when the relay coil 916 is energized, contacts 330, 320 are closed, the motor is momentarily energized. This momentary motor actuation will cause switch index disc 30 to turn with and in the same direction as the motor shaft revolution, pushing arm 2000 of leaf switch S5 upwardly, thus causing said arm to raise out of its indentation in the disc 30 to the high segment 4000 thereof and thereby opening contacts 111 and 112 of the switch. The momentary energization voltage to motor 326 ceases a short time after the closure of the contacts 112 and 113.

At this time, voltage continues to be supplied to the motor 326 from the 110 volt source, through wire 114, contacts 113 and 112 and wire 109. This will cause index disc 30 to continue its movement to the next indentation. When arm 2000 of S5, which is joined to contact 112, drops into the next indentation, contacts 112 and 113 are again opened. Motor 326 is thus de-energized and remains in this state until energized again by the closing of the circuit beginning from the 110 volt source, through wire 108, contacts 329 and 330 etc., as described above. Index disc 30, the movable contacts of ganged rotary switches S6 and S7 and the output shaft of motor 326 are mechanically coupled, as indicated by the dotted line 425. This coupling insures synchronized stepping of all components. Movable contact 318 of rotary switch S6 and movable contact 332 of rotary switch S7 will traverse whichever metal contacts they are in engagement with and will wipe such contacts, contacts 319 and 333 as shown in the switch position shown in FIG. 1, until the sharp drop to the succeeding contacts. Mechanical details of the ganged motor driven switch S6, S7 are described below in connection with FIGS. 3 through 6.

Cycling initiation selector switch S3 in the number one position, as illustrated in FIG. 1 provides for leak off of condenser 315 through wire 314, grid 313, wire 312, contacts now closed 311, 316, wire 317, movable contact 318, contact 319, wire 320, pole A, movable contact 321, contact 322, wire 27, contact 316, wire 100, resistor 323, wire 325, wire 326, now closed contacts 101, 102 wire 103, contact 104, movable contact 55, pole E, wire 105, wire 106, wire 107, to the top coil terminal of relay 916. Switch S3, in the number one position will also provide the high side of the 110 volt A.C. line through the winding of the tape motor 32, from terminal 31, wire 33, pole B, movable contact 34, contact 35, wire 36, to terminal 1001 of condenser 37 and relay coil 38. The relay coil 38 is associated within relay plate circuit of tube V2 comprising part of the phototube unit enclosed by the dotted line enclosure P. This unit can be used to initiate cycling of the electronic timer, which serves as the sound and picture synchronizer when the image of a person falls on the sensitive surface of the phototube. The phototube's output is lowered because of the decreased amount of light falling on the phototube sensitive surface.

After the tape motor 32 has been energized, a completed circuit through the motor winding and from terminal 31, will supply 110 volt A.C. line voltage, through coil 38 to plate 1500 of tube V2, blocking the tube so that coil 38 cannot be energized until tape motor 32 stops. After tape motor 32 is de-energized, coil 38 receives the high side of the 110 volt line voltage and conduction of V2 will then energize coil 38.

The blocking of tube V2 while tape motor 32 is energized is necessary to prevent the activation of electronic timer before the tape mechanism completes its cycle. This action assures synchronization of the electronic timer and the tape mechanism.

Cycling initiation selector switch S3 in number one position also provides 6.3 A.C. filament supply from filament transformer T, through wire 39, pole C, movable contact 40, contact 41, wire 42 to filament 43 of tube V2.

Cycling initiation selector switch S3 in a number one position also provides high side 110 volt A.C. line voltage to the phototube unit P by way of wire 44, pole D, movable contact 43, contact 46, wire 47 to resistor BB. The low side of the 110 A.C. line voltage is supplied through wire 48, wire 49, the cathode 50 of phototube V3, resistor 51, wire 52, screen grid 53, cathode 54, and filament 43.

Cycling initiation switch S3 in the number one position also provides for the activation of the electronic timer by the closing operation of contacts 101, 102, of the phototube relay unit by means of the circuit from the wire 103, contacts 101, 102, wire 326, wire 325, resistor 323, wire 100, contacts 316 and 322, movable contact 321, pole A, wire 320, contact 319, movable contact arm 318, wire 317, closed contacts 316, 311, wire 312, grid 313, wire 314 to condenser 315.

Cycling initiation switch S3 in the number two position provides the high side of the 110 volt A.C. line through the winding of the tape motor 32, in a non-energized state. This 110 volt A.C. line is supplied through motor terminal 31, wire 33, pole B of switch S3, movable contact 34, contact 58, resistor 59, to contact 322. The above action will prevent the activation of the electronic timer since the energized tape motor 32 will provide A.C. voltage to contact 322 of S3. A.C. voltage at this point will block the leak off of condenser 315. This action is necessary to maintain synchronization of the electronic timer and tape mechanism.

Cycling initiation switch S3 in the number two position provides for the bleed-off of condenser 315 through a remote switch. Action for bleed-off at number two position will be the same as for number one position as described above up to movable contact 55 of switch S3 from which the circuit proceeds from contact 60, wire 61, through resistor 324, through closed S2 across outlet 0 (plugged into outlet 0) then through wire 325, resistor 323, wire 100, contact 316, movable contact 321, pole A, wire 320, contact 319, movable contact 318, wire 317, closed contacts 316, 311, wire 312, grid 313, wire 314, to condenser 315.

Cycling initiation selector switch S3 in the number three position provides for continuous activation of the electronic timer, and the synchronization will activate the tape mechanism motor 32, when stepping relay 425 steps to the number one lamp 702 of the illuminator. At the same time power is supplied to contact 705 of the tape timer S8.

Switch S3 in the number three position provides 110 volt A.C. line from terminal 31 of energized tape motor 32, through wire 33, pole B, movable contact 34, contact 400, through resistor 401 to contact 402. The above circuit prevents bleed-off of condenser 315. After movable contact 318 of S6 steps to contact 319 and motor 32 is de-energized by the tape timer S8, the 110 volt A.C. blocking action is terminated. Then condenser 315 can bleed-off, by way of grid 313, wire 312, contacts 311 and 316, wire 317, movable contact 318, contact 319, wire 320, pole A, movable contact 321, contact 402, resistor 403, wire 106, wire 107 to the top coil terminal of relay 916. S3 in the number four position provides for automatic time delay of the electronic timer. Number five position provides for a fifty second period; number six position provides for a seventy second period; number seven position provides for a ninety second period, and number eight position provides for a one hundred and twenty second period.

Switch S4 is provided as a means for the selection of any number of lamps, from two to six. All contacts through 6 of this switch provide the low side of the 110 volt A.C. line to the motor 326, through movable contact 5000 and pole G to wire 359, causing stepping switch 425 to cancel all steps beyond the number at which switch S4 section G is set. When the sixth contact is wiped, the stepping action is continued through section F of switch S4. This section provides for a timed period or a quick bleed-off whenever number six contact of S6 is wiped. By way of example, a timed bleed-off circuit can be traced starting with movable contact 318 of switch S6, through contact 6, wire 7, pole F, movable contact 8, contact 9, wire 10, potentiometer E6, wire 11, resistor 12, wire 13, wire 107, to the top coil terminal of relay 916.

A quick bleed-off will occur at all contacts of section F of switch S4, except in the number one position. Starting with movable contact 8, the quick bleed-off is accomplished through the ganged contacts 2, 3, 4, 5, 6, resistor 14, wire 106, wire 107, to the top coil terminal of relay 916.

S4 section G provides for the selection of a desired number of lamps to be illuminated. This is achieved by shorting unwanted contacts and applying the voltage of these contacts, or contact to the stepping switch motor 326. This action will cause stepping switch to step to number six contact. Section F of switch S4 controls lamp number six. The action at this point depends on the position of section F.

If switch S4 is in a number one position, there will be a timed delay, depending on the setting of potentiometer E6. Otherwise, if in any position other than number one position, there will be a quick bleed-off of condenser 315, thus the stepping relay will step to a starting position. This bleed-off action occurs whenever movable contact 8 engages any one of the ganged contacts 2 to 6 of section F. For example, when switch S4 section G is in the number six position, the illumination of one lamp is provided for. The second step will cause the stepping relay 425 to step until the starting position is reached.

Further, the four contacts 5, 4, 3, 2 of section G correspond to lamp terminals 5, 4, 3 and 2. When movable contact 332 of switch S7 steps to any contact 2, 3, 4 or 5, the low side of the 110 volt A.C. line is applied to one terminal of the lamps and is also supplied to the terminal of the motor 326 by way of the shorted contacts or contact. Number six lamp is joined to number six contact of S7 and is also joined to contact 333 of S7. Contact 333 is the waiting position. If there is a waiting period, the low side of the 110 volt A.C. line is supplied to the number six lamp terminal 503, by way of contact 332, contact 333, wire 301, wire 701e to terminal 503, of lamp number six. This lamp will remain illuminated throughout the waiting period, that is, until the electronic timer is activated either by way of the phototube unit, remote switch, or one of the various automatic time delay circuits described above.

E1, E2, E3, E4, E5 and E6 indicate variable resistances, the resistance setting of each of which controls the condenser leak-off time, through each separate switch contact of switch S6, so that the individual time periods for the corresponding illuminated lamps will coincide with the length of narration or music for each picture or scene. It will now be evident that contacts 507, 508, 509, 600 and 601 of switch S6 provide the means for the controlled leak-off of condenser 315 through whichever movable contact 318 happens to engage and wipe. After completion of all controlled bleed-offs, the stepping relay 425 will continue its stepping action until its return to the starting position, where movable contact 332 will wipe and remain on contact 333, supplying power to number six lamp.

Switch S8 is the timer for recording tape motor 32. Selective means for predetermining the running time period of the tape mechanism, comprising a six-gang, three position switch S9, is provided. Switch S9 in the number one position provides a circuit for a twenty-three second running time period for the tape mechanism; the number two position, a circuit for a thirty-five second period; and in number three position, a circuit for a seventy second running period.

Switch S9, sections 9, 5, 4, 6, 7, 8, in the number one position as illustrated in FIG. 2 provides the twenty-three second period. Considering now the operation of this circuit and starting with movable contact 332 of switch S7, engaging contact 700, the low side of the 110 volt A.C. line is supplied through wire 701, to number one lamp terminal 702 and then wire 703, wire 704, contact 705 of switch S8 through movable contact 706, rotary contact 707, wire 708a, to terminal 31a. The low side of the 110 volt A.C. line will be applied to the energization coil of relay 32a as long as the movable contact 706 of switch S8 wipes contact 705, before the sharp drop to contact 709. The movable contact 706, will continue to wipe ganged contacts 709, 800, 801 until the sharp drop to contact 802. During this operation, tape motor 32 will run, receiving the low side voltage supply through wire 934a, now closed contacts 31b of relay 31c and wire 708 to terminal 31. Due to the fact that the assembly of the rotary contact 707, movable contact 705, are joined to the output of a gear train 32d through an arrangement of belt and pulleys, the timing switch is driven by the tape motor 32. Now it will be understood that when the shaft of the tape motor 32 revolves, the movable contact 706 will traverse the periphery of the timing disc's twelve contacts. When movable contact 706 makes the sharp drop from contact 801 to contact 802, the tape motor 32 will be de-energized and thus will remain so until the movable contact 332 of switch S7 again engages contact 700.

All the variable resistances E1 through E6 have a minimum bleed-off time of eight seconds. The movable contact 706 will wipe the contacts of timing switch S8 in approximately five seconds. It will be evident that since the time required for movable contact 706 to move from one contact to another is five seconds, and the supply from terminal 702 is eight seconds, tape motor 32 will have sufficient period of energization through terminal 702, wire 703, 704 and contact 705, to move movable contact 706 to the sharp drop to ganged contacts 709, 800, 801.

The low side of the 110 volt A.C. line is supplied to contacts 709, 800, 801 by way of wire 904, contacts 900, 809, 807, wire 905, contact 906, movable contact 907, pole 8a, wire 908, wire 909, contact 910, movable contact 911, pole 7a, wire 912, contact 913, movable contact 914, pole 6a, wire 915, contact 916, movable contact 917, pole 4, wire 918, to ganged contacts 801, 800, 709. After the sharp drop to contact 802, tape motor 32 will be de-energized. After activation, energization is supplied through contact 700 of switch S7, wire 701, lamp terminal 702, wire 703, wire 919, contact 920, movable contact 921, pole 5a, wire 922 to contact 802. Starting with contact 803 of switch S8, energization is effected through wire 923, wire 915, pole 6a, movable contact 914, contact 913, wires 925, and 926, to contact 804. Starting from contact 807 energization is effected through wire 905, contact 906, movable contact 907, pole 8a, wire 908, wire 927 to contact 805. If switch S8 is in a number one position as illustrated, there will be a stop upon the sharp drop to contact 805. Further energization of tape motor 32 has to take place through lamp terminal 702, wire 703, wire 919, contact 928, movable contact 929, pole 9a, wire 930 to contact 806. Energization of tape motor 32 will be supplied from contact 806, until the sharp drop to contact 807. Further energization will be supplied through ganged contacts 807, 809, 900 and by way of wire 904, to terminal 903, the low side input of the 110 volt A.C. line.

The switch S9 in number two position provides for a thirty-five second period running time of the tape mechanism. Energization is effected from lamp terminal 702, wires 703, 704, contact 705, movable contact 706 through rotary contact 707, wire 708a to terminal of coil 31a. The tape motor is energized through closed contacts 31b. Motor 32 will remain energized until the sharp drop to contact 709. Then ganged contacts 709, 800, 801 will continue the energization of relay coil 31a by way of wire 918, pole 4a, movable contact 917, contact 931, wire 922 and contact 802. Energization of relay coil 31a is continued from contact 803, until the sharp drop to contact 804. The supply to contact 807 is joined directly to the low side of the 110 volt A.C. line. Starting with contact 807, energization is effected through wire 953, contact 952, movable contact 929, pole 9a, wire 930, contact 806, wire 951, contact 950, movable contact 907, pole 8a, wire 908, contact 940, movable contact 914, pole 6a, wire 915, wire 923, contact 803. After the sharp drop to contact 804, the thirty-five second period ends. The circuit for the next following thirty-five second period can be traced from contact 804, through wire 926, wire 925, wire 912, pole 7a, movable contact 911, contact 941, wire 942, wire 703, to number one lamp terminal 702. The tape motor 32 will run until the sharp drop of movable contact 706 to contact 805. Then energization is effected through wire 927, wire 908, pole 8a, movable contact 907, contact 950, wire 951, contact 806, wire 930, pole 9a, movable contact 929, contact 952, wire 953, through ganged contacts 807, 809, 900, wire 904 to terminal 903, the low side input of the 110 volt A.C. line.

The switch S9 in the number three position provides for a seventy second running time period of the tape mechanism. After the sharp drop from contacts 709, 800, 801 to contact 802, energization circuit is continued by way of contact 802, wire 922, pole 5a, movable contact 921, contacts 960, 933, wire 932, to contact 803; from contact 803 to wire 923, wire 915, pole 6a, movable contact 914, contact 961, wire 926, to contact 804; from contact 804 to wire 926, contact 961, wire 925, wire 912, pole 7a, movable contact 911, contact 805, wire 927, wire 908, pole 8a, movable contact 907, contacts 965, 950, wire 951 to contact 806, then to wire 930, pole 9a, movable contact 929, contacts 966, 952, wire 953 to ganged contacts 807, 908, 900, wire 904, to the terminal 903 of the 110 volt A.C. low side of the line. Energization of tape motor 32 will cease after the sharp drop to contact 705; thus completing the seventy second period running operation of the tape motor.

Neon lamp 9000 connected to the low side of the line through a current limiting resistor Z, Za, 323 and 311, provides a means by which the polarity of the 110 volt A.C. line can be matched to the input circuit of the electronic timer. To test for correct polarity, the line switch S1 must be in "off" position and the line cord connected to the 110 volt A.C. line only. If the neon lamp shows a faint glow when the switch handle is touched with the tip of the finger, the line plug must be reversed. After correct plug position has been determined for proper polarity connection, the switch S1 can be turned to "on" position. It is assumed that the casing for the toggle switch S1 is grounded to the chassis, as is also the neon tube 9000 through the resistor Z, and that when a person touches the handle of the switch (grounded to the switch casing), the body of that person supplied ground to the chassis. If the plug is so connected that the high side of the input current is connected to the low side of the line, the plug must be reversed.

Neon lamp 9001 also provides a means for visual adjustment or setting of the sensitive control potentiometer BB and CC of the phototube unit. When neon lamp 9001 glows, the bleed-off circuit through contacts 101 and 102 associated with the relay 38 in the plate circuit of the phototube amplifier 2 is open, indicating that the light differential operated phototubes V3 and V4 in the grid circuit of amplifier tube V4 are not in control.

Means is also provided for activating the electronic timer by insertion of a coin. A coin inserted in the chute S (FIG. 2) comes to rest against a pivot arm U. The metal chute, coin and metal arm U act as a closed switch interconnecting the wires 320 and 106. Thus a quick bleed-off of condenser 315 is effected by way of contact 19 of stepping switch S6, through wire 320, chute S, coin C, pivot arm U, wire 106, wire 107, to top terminal of relay coil 916. The thus actuated electronic timer, upon its step to the number one position will energize relay coil 31a, by way of terminal 702 of lamp number one, wire 703, 704, contact 705, contact arm 706, rotary contact 707 and wire 708a. Contacts 31b of relay 31a will thus be moved to the downward closed position and arm U will be swung away from the coin C thus providing an opening sufficient to allow said coin C to pass. Energization of the relay 31a will also close-circuit its associated switch 31c, closing the circuit to the speaker forming part of the amplifying system (not shown) connected with the tape recorder mechanism illustrated in FIGS. 9, 10 and 11.

The mechanical details of the two-gang stepping switch mechanism corresponding to the two switches S6 and S7 and their associated drive motor and ratchet wheel as shown in FIG. 1 will now be described with reference to FIGS. 3 through 6. The switch generally designated by reference numeral 10a comprises a pair of spaced parallel end mounting brackets 11a, 12a interconnected by a U-shaped end wall 13a as by screws or rivets 14a. Secured against the outer end of the end wall 13a is a drive motor 15a having a reduced speed output shaft 425 extending through the said wall. Secured on said shaft is a ratchet wheel 30 having a number of peripheral steps equal to the number of switch positions (eight in the present example). Secured within the U-shaped end wall 13a is a single-pole double-throw micro-switch 16a having its actuating lever cooperatively disposed with respect to the ratchet wheel 30. The switch unit 16a corresponds to the switch S5 schematically illustrated in FIG. 1.

Coaxially disposed with respect to the output shaft 425 are a pair of centrally apertured timing discs 17a, 18a, of insulating material, held in spaced relation between the brackets 11a, 12a by respective angularly disposed mounting straps 19a, 20a, as best can be seen in FIG. 4. The discs 17a, 18a are formed about their periphery with angular steps within which are secured individual metallic wiping contact members 21a having extensions 22a overhanging the next successive contact member. Said contact members each are formed with angularly bent side portions 23a riveted as at 24a for securing them in place in their respective timing discs 17a, 18a (see FIG. 5). The rivets 24a furnish convenient contact terminals to which circuit wiring can be soldered. The timing disc 17a has secured about its central opening an annular contact ring 25a to which circuit connection can be made by soldering and which is contacted by a rotor brush member 26a forming part of a rotary contactor 27a. The contactor 27a comprises an apertured U-shaped member 28a securely mounted on the shaft 425 by a screw 29b. Riveted to the U-shaped member 28a is an insulating arm 29a. The arm 29a carries the resilient brush member 26a in such a manner that it is always in contact with the ring 25a while the shaft 425 rotates. The rotary arm 29a also carries a pin 30a about which is wound a spring contactor 31a having one end 32a anchored in the opening of the rivet connecting the brush member 26a so as to be in electrical contact therewith. The other end of the spring contactor 31a is bent into a U-shaped portion 33a that resiliently presses against the respective wiping contact members 21a to make individual contact therewith as the shaft 42S is rotated by the drive motor 15a.

The rotary contactor 34a associated with the timing disc 18a differs from the rotary contactor 17a only in that the rotor brush member 35a is connected directly to the wiring, indicated at W, through a rotary connector member 36a.

Figure 10:
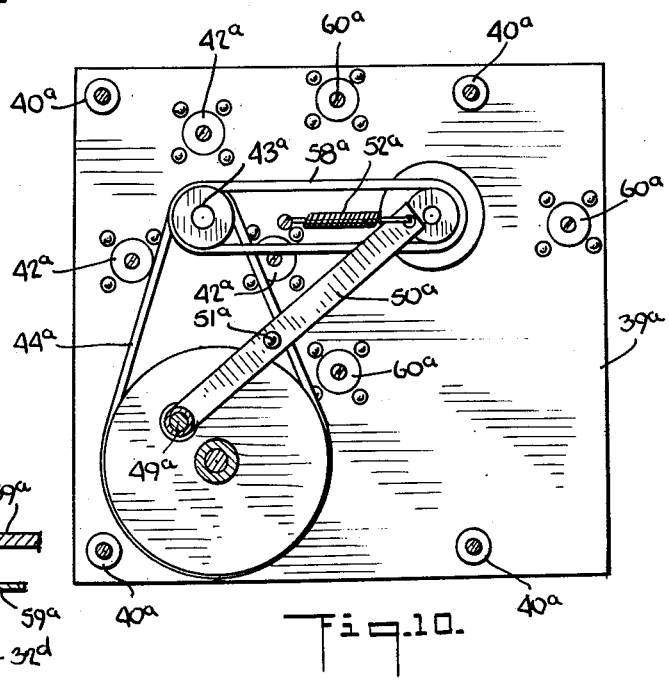
FIG. 10 is a horizontal cross-sectional view of the recorder unit taken along the line 10—10 of FIG. 9.
Figure 11:
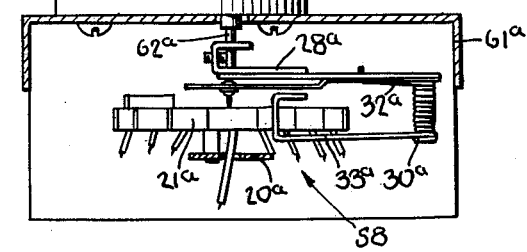
FIG. 11 is a side view partly in section of the sequential switch associated with the recorder unit and the drive mechanism for the switch.

The mechanical details of the tape recorder unit associated with the display apparatus will now be described in detail with reference to FIGS. 7 through 11. The recorder mechanism is supported on a chassis comprised of two parallel plates 38a, 39a held in spaced relation by four spacers 40a through which interconnecting bolts 41a extend. Mounted against the underside of plate 39a and resiliently supported by shock mount members 42a is the tape drive motor 32. The drive shaft of motor 32 extends into the space between the parallel chassis plates 38a, 39a and is fitted with a drive pulley 43a. A tape drive belt 44a interconnects the pulley 43a with a fly wheel 45a rotatably supported on a journal pin 46a fixed at one end to the lower chassis plate 39a. The fly wheel 45a has a sleeve portion 47a which extends through the upper chassis plate 38a and serves as the driving capstan of the sound tape T. A pressure roller 48a journalled on a pin 49a fixed at one end of a lever 50a (FIG. 10) is disposed to resiliently press the moving tape T against the driving capstan. The lever 50a is pivoted by a pin 51a to the underside of the chassis plate 39a. The other end of the lever 50a is resiliently urged in the anti-clockwise direction, as seen in FIG. 10, by means of a coil spring 52a having one end connected to said lever and the other end secured to a pin 53a fixed against the underside of the chassis plate 38a. As best seen in FIG. 7, the tape 7 is guided by a pair of guide rollers 54a, 55a mounted upon the top of chassis plate 38a from the endless tape reel 56a also journalled upon the top of said chassis plate. A pick-up head 57a is cooperatively disposed with respect to the tape T at the position where it passes between the capstan 47a and the guide roller 55a.

The motor drive pulley 43a is fitted with a second belt 58a interconnecting said pulley with a speed reduction unit 32d. The speed reduction unit 32d is mounted on a plate 59a resiliently supported below the chassis plate 39a by three shock mount members 60a. Secured to the underside of the speed reduction unit 32d is a boxlike structure 61a within which the tape timing sequential switch S8 is arranged, said switch being driven by the output shaft 62a of said speed reduction unit. The constructional details of the stepping switch S8 are the same as those already described in connection with the outer rotary switch shown in FIGS. 3 through 6.

While the device has been shown and the structure described in detail, it is obvious that this invention is not to be considered limited to the exact form disclosed, but that changes may be made therein, within the scope of what is claimed, without departing from the spirit of the invention.

Having thus disclosed and set forth the invention, what I claim is:

1. In combination, a sound record means comprising a plurality of record portions, a plurality of lamps, one for each portion, means to play back said sound record means, time controlled means to illuminate the lamps sequentially in synchronization with the play back of said record portions, said time controlled means comprising a circuit, a stepping switch in said circuit, means controlled by the stepping switch to control the illumination of the respective lamps, a motor for said stepping switch, a relay to control said motor, said circuit including a condenser, means controlled by the relay to control the charge and discharge of the condenser, a vacuum tube in said circuit, said condenser being connected on one side to the cathode of the tube, and on the other side, to the grid of the tube, and potentiometers associated with said lamps, respectively, and means associated with said potentiometers to control the tube, and said stepping switch having means to control said potentiometers, whereby the timing of the illumination of the lamps is controlled by the settings of the potentiometers for said lamps.

2. The combination of claim 1, and means to cut current through the stepping switch while moving the stepping switch from one stepped position to the next stepped position.

3. The combination of claim 1, and means to maintain a negative potential on the grid of said tube when the time control means is not operating.

References Cited in the file of this patent

UNITED STATES PATENTS

| | | |
|---|---|---|
| 1,834,188 | Thau | Dec. 1, 1931 |
| 2,088,516 | Grier | July 27, 1937 |
| 2,092,761 | Klein | Sept. 14, 1937 |
| 2,210,715 | Gulliksen | Aug. 6, 1940 |
| 2,283,632 | Holland-Letz | May 19, 1942 |
| 2,314,920 | Bumstead | Mar. 30, 1943 |
| 2,340,863 | Carpenter et al. | Feb. 8, 1944 |
| 2,556,753 | Galstaum et al. | June 12, 1951 |